United States Patent
Danskin

(10) Patent No.: US 8,026,912 B1
(45) Date of Patent: Sep. 27, 2011

(54) SYSTEM AND METHOD FOR STRUCTURING AN A-BUFFER

(75) Inventor: John M. Danskin, Providence, RI (US)

(73) Assignee: NVIDIA Corporation, Santa Clara, CA (US)

( * ) Notice: Subject to any disclaimer, the term of this patent is extended or adjusted under 35 U.S.C. 154(b) by 964 days.

(21) Appl. No.: 11/950,352

(22) Filed: Dec. 4, 2007

(51) Int. Cl.
*G06T 15/00* (2011.01)

(52) U.S. Cl. ......... 345/419; 345/421; 345/422; 345/428

(58) Field of Classification Search .................. 345/419, 345/421, 422, 428
See application file for complete search history.

(56) References Cited

U.S. PATENT DOCUMENTS

| | | | |
|---|---|---|---|
| 6,697,063 B1 * | 2/2004 | Zhu | 345/421 |
| 7,167,181 B2 * | 1/2007 | Duluk et al. | 345/506 |
| 7,170,515 B1 * | 1/2007 | Zhu | 345/422 |

* cited by examiner

*Primary Examiner* — Phu Nguyen
(74) *Attorney, Agent, or Firm* — Patterson & Sheridan, LLP

(57) ABSTRACT

One embodiment of the present invention sets forth a technique for efficiently creating and accessing an A-Buffer with a GPU. The A-Buffer is organized in arrays of uniformly-sized tiles. Each array represents a group of pixels, and each tile within an array includes the set of fragments at a specific depth complexity that are associated with the pixels in the pixel group represented by the array. The size of the tiles may be selected to be the minimum necessary for efficient memory access. The GPU determines the number of tiles in each array by calculating the maximum of the depth complexity associated with the pixels in the pixel group represented by the array and creates a corresponding prefix sum image to allow the GPU to efficiently locate the array associated with a given pixel group in the A-Buffer for addressing purposes. Advantageously, structuring the A-Buffer by both pixel proximity and depth complexity improves memory locality, thereby improving the overall rendering performance of the graphics pipeline.

20 Claims, 8 Drawing Sheets

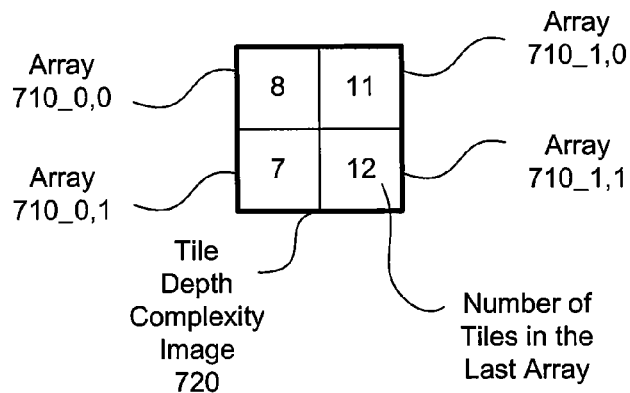
Figure 7A
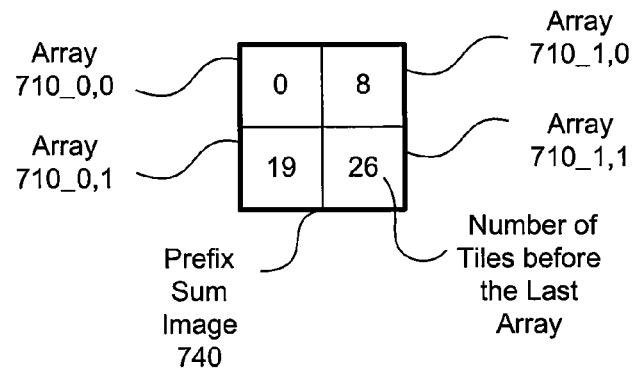
Figure 7B
Number of Tiles =
( Number of Tiles in the Last Array ) +
( Number of Tiles before the Last Array ) =
12 + 26 = 38
Figure 7C

SYSTEM AND METHOD FOR STRUCTURING AN A-BUFFER

BACKGROUND OF THE INVENTION

1. Field of the Invention

The present invention relates generally to the field of graphics processing and more specifically to a system and method for structuring an A-Buffer.

2. Description of the Related Art

A typical computing system includes a central processing unit (CPU) and a graphics processing unit (GPU). Some GPUs are capable of very high performance using a relatively large number of small, parallel execution threads on dedicated programmable hardware processing units. The specialized design of such GPUs usually allows these GPUs to perform certain tasks, such as rendering 3-D scenes, much faster than a CPU. However, the specialized design of these GPUs also limits the types of tasks that the GPU can perform. The CPU is typically a more general-purpose processing unit and therefore can perform most tasks. Consequently, the CPU usually executes the overall structure of the software application and configures the GPU to perform specific tasks in the graphics pipeline (the collection of processing steps performed to transform 3-D images into 2-D images).

One task that may be performed when transforming 3-D images into 2-D images is to determine the visible color of each pixel in the image. To accurately determine the color at each pixel, the fragment of each pixel intersected by an object may be evaluated to create a portion of the overall color of the pixel that includes a variety of effects, such as transparency and depth complexity of field. In some approaches, objects may need to be rendered in a specific order to ensure that the visible color of each pixel in the generated image is realistic. However, in other approaches the fragments corresponding to each pixel may be collected, sorted, and reduced to an image which accurately displays advanced effects irrespective of the order in which the objects are rendered. One structure that computing systems may implement in these various approaches is an A-Buffer—a memory structure that maintains a collection of fragments associated with each polygon that intersects the pixels in an image frame being rendered for display.

In one approach to organizing an A-Buffer, the CPU is used to create and address, in software, a linked list of fragments per pixel. One drawback to this approach is that the A-Buffer structure is not conducive to some of the most frequent fragment access patterns. For example, when a polygon is rendered, many of the corresponding fragments are located in adjacent pixels at the same depth complexity. As is well known, memory accesses are usually most efficient if they can be grouped such that successive accesses target data that is closely located within the memory—known as memory locality. Thus, an efficient memory structure would enable fragments of this nature, located at the same depth complexity, to be simultaneously accessed. However, since each pixel in the A-Buffer has a separate linked list, fragments corresponding to adjacent pixels at the same depth complexity may be far apart in memory, leading to poor memory locality. Consequently, accesses to the A-Buffer may be inefficient.

Another drawback to this approach is that the CPU ends up performing many of the A-Buffer operations rather than the GPU. As is well-known, graphics processing efficiency is increased when graphics processing operations are consolidated in the GPU. This problem can be addressed by having the GPU create and address the A-Buffer using the linked list approach detailed above, but such a solution does not address the depth complexity locality problem. Furthermore, linked list operations are not usually performed efficiently in hardware, such as the raster operations unit in the GPU, and, therefore, such a solution would not necessarily improve the overall efficiency of A-Buffer operations.

As the foregoing illustrates, what is needed in the art is a more effective technique for creating and accessing an A-Buffer.

SUMMARY OF THE INVENTION

One embodiment of the present invention sets forth a method for generating an A-Buffer for storing pixel information. The method includes the steps of receiving an image frame comprised of a plurality of pixels, dividing the image frame into one or more pixel groups, where a number of pixels in each of the one or more pixel groups is based on a tile size, generating a pixel depth complexity image based on the image frame, where each entry in the pixel depth complexity image reflects a depth complexity associated with a different one of the pixels in the plurality of pixels, and generating a tile depth complexity image based on the pixel depth complexity image, where each entry in the tile depth complexity image reflects a maximum depth complexity associated with a different one of the one or more pixel groups. The method also includes the steps of determining a number of tiles associated with the A-Buffer based on the tile depth complexity image, and allocating memory space for the A-Buffer based on the number of tiles associated with the A-Buffer.

One advantage of the disclosed method is that organizing the A-Buffer by both pixel proximity and pixel depth complexity improves the memory locality, thereby increasing the efficiency of memory accesses used when rendering image data. Moreover, the designer may select an appropriate tile size, considering factors such as memory locality and the burst-lengths of the different memory elements in the system, to optimize the performance and memory usage of the A-Buffer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 7A-7C are conceptual diagrams of certain images and calculations that are used during the creation of the A-Buffer of FIG. 1, according to one embodiment of the invention.

DETAILED DESCRIPTION

Figure 1:
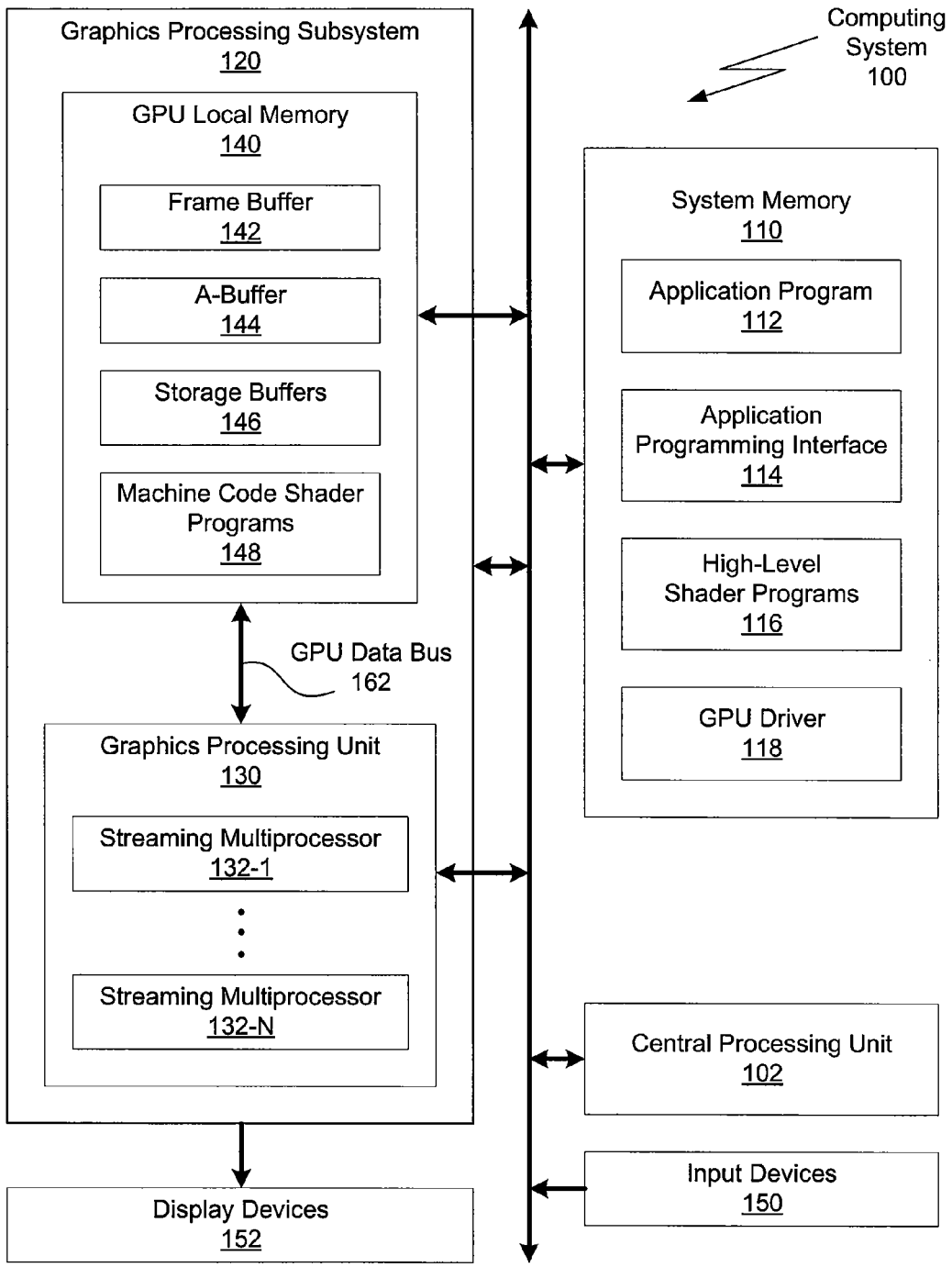
FIG. 1 is a conceptual diagram of a computing system in which one or more aspects of the invention may be implemented.

FIG. 1 is a conceptual diagram of a computing system 100 in which one or more aspects of the invention may be implemented. As shown, the computing system 100 includes a system data bus 160, a central processing unit (CPU) 102, input devices 150, a system memory 110, a graphics processing subsystem 120, and display devices 152. In alternate embodiments, the CPU 102, portions of the graphics processing subsystem 120, the system data bus 160, or any combination thereof, may be integrated into a single processing unit. Further, the functionality of the graphics processing subsystem 120 may be included in a chipset or in some other type of special purpose processing unit or co-processor.

The system data bus 160 connects the CPU 102, the input devices 150, the system memory 110, and the graphics processing subsystem 120. In alternate embodiments, the system memory 110 may connect directly to the CPU 102. The CPU 102 receives user input from the input devices 150, executes programming instructions stored in the system memory 110, operates on data stored in the system memory 110, and configures the graphics processing subsystem 120 to perform specific tasks in the graphics pipeline. The system memory 110 typically includes dynamic random access memory (DRAM) used to store programming instructions and data for processing by the CPU 102 and the graphics processing subsystem 120. The graphics processing subsystem 120 receives instructions transmitted by the CPU 102 and processes the instructions in order to render and display graphics images on the display devices 152.

The system memory 110 includes an application program 112, an application programming interface (API) 114, high-level shader programs 116, and a graphics processing unit (GPU) driver 118. The application program 112 generates calls to the API 114 in order to produce a desired set of results, typically in the form of a sequence of graphics images. The application program 112 also transmits one or more high-level shading programs 116 to the API 114 for processing within the GPU driver 118. The high-level shading programs 116 are typically source code text of high-level programming instructions that are designed to operate on one or more shaders within the graphics processing subsystem 120. The API 114 functionality is typically implemented within the GPU driver 118. The GPU driver 118 is configured to translate the high-level shading programs 116 into machine code shading programs that are typically optimized for a specific type of shader (e.g., vertex, geometry, or fragment).

The graphics processing subsystem 120 includes a graphics processing unit (GPU) 130, a GPU local memory 140, and a GPU data bus 162. The GPU 130 is configured to communicate with the GPU local memory 140 via the GPU data bus 162. The GPU 130 may receive instructions transmitted by the CPU 102, process the instructions in order to render graphics data and images, and store these images in the GPU local memory 140. Subsequently, the GPU 130 may display certain graphics images stored in the GPU local memory 140 on the display devices 152.

The GPU 130 includes one or more streaming multiprocessors 132. Each of the streaming multiprocessors 132 is capable of executing a relatively large number of threads concurrently. Advantageously, each of the streaming multiprocessors 132 can be programmed to execute processing tasks relating to a wide variety of applications, including but not limited to linear and nonlinear data transforms, filtering of video and/or audio data, modeling operations (e.g. applying of physics to determine position, velocity, and other attributes of objects), and so on. Furthermore, each of the streaming multiprocessors 132 may be configured as one or more programmable shaders (e.g., vertex, geometry, or fragment) each executing a machine code shading program (i.e., a thread) to perform image rendering operations. The GPU 130 may be provided with any amount GPU local memory 140, including none, and may use GPU local memory 140 and system memory 110 in any combination for memory operations.

The GPU local memory 140 is configured to include machine code shader programs 148, storage buffers 146, an A-Buffer 144, and a frame buffer 142. The machine code shader programs 148 may be transmitted from the GPU driver 118 to the GPU local memory 140 via the system data bus 160. The machine code shader programs 148 may include a machine code vertex shading program, a machine code geometry shading program, a machine code fragment shading program, or any number of variations of each. The storage buffers 146 are typically used to store shading data, generated and used by the shading engines in the graphics pipeline. The A-Buffer 144 may be used to store a collection of fragments associated with each polygon that intersects the pixels in an image frame that is being rendered for display. The frame buffer 142 stores data for at least one two-dimensional surface that may be used to drive the display devices 152. Furthermore, the frame buffer 142 may include more than one two-dimensional surface so that the GPU 130 can render to one two-dimensional surface while a second two-dimensional surface is used to drive the display devices 152.

The display devices 152 are one or more output devices capable of emitting a visual image corresponding to an input data signal. For example, a display device may be built using a cathode ray tube (CRT) monitor, a liquid crystal display, or any other suitable display system. The input data signals to the display devices 152 are typically generated by scanning out the contents of one or more frames of image data that is stored in the frame buffer 142.

Figure 2:
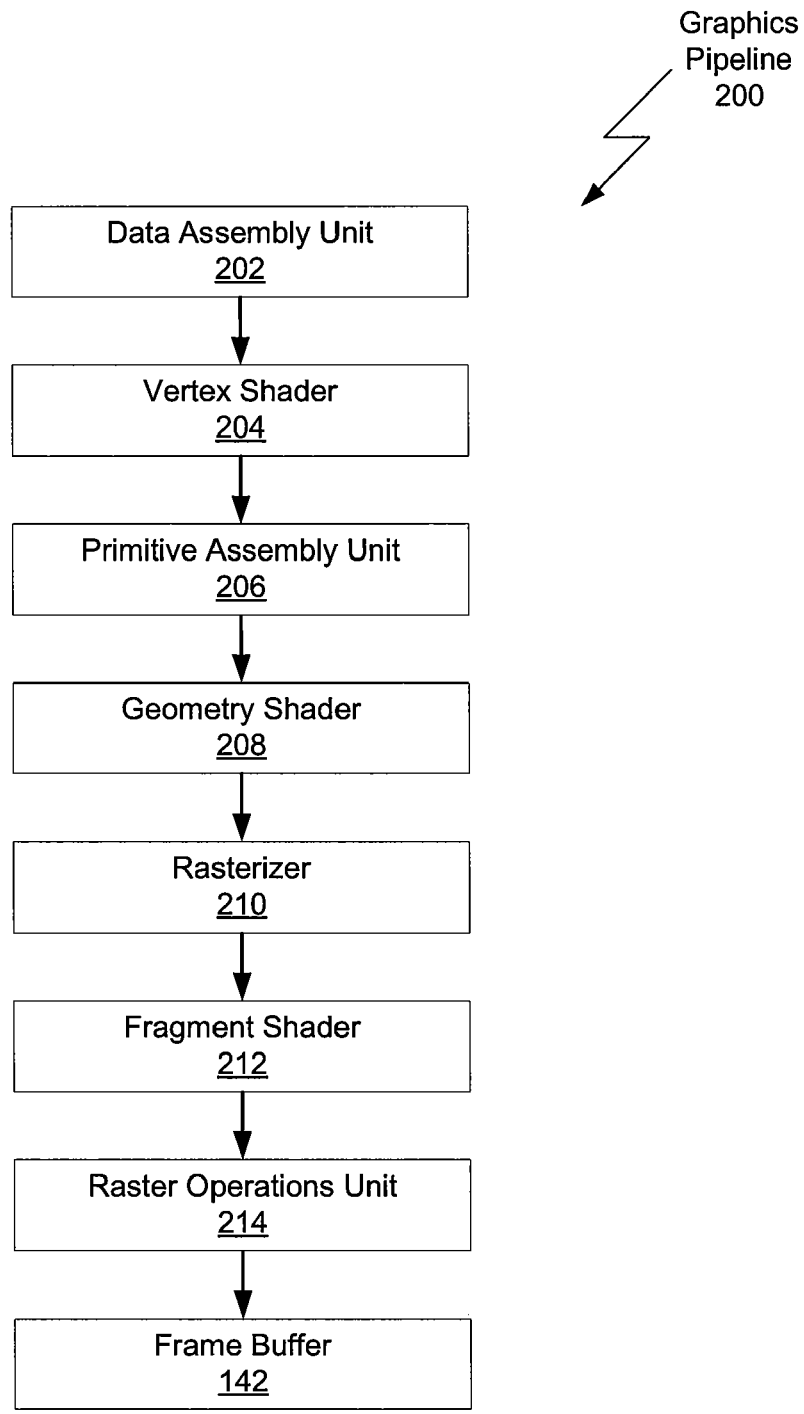
FIG. 2 is a conceptual diagram of a programmable graphics pipeline residing within the GPU of FIG. 1, according to one embodiment of the invention.

FIG. 2 is a conceptual diagram of a programmable graphics pipeline 200 residing within the GPU 130 of FIG. 1, according to one embodiment of the invention. The graphics pipeline 200 is configured to transform 3-D images into 2-D images. As shown, the graphics pipeline 200 includes a data assembly unit 202, a vertex shader 204, a primitive assembly unit 206, a geometry shader 208, a rasterizer 210, a fragment shader 212, a raster operations unit 214, and the frame buffer 142 of FIG. 1.

The data assembly unit 202 is a fixed-function unit that collects vertex data from the application program 112 for high-order surfaces, primitives, and the like, and passes the vertex data to the vertex shader 204. The data assembly unit 202 may gather data from buffers stored within system memory 110 and the GPU local memory 140 as well as from API calls from the application program 112 used to specify vertex attributes. The vertex shader 204 is a programmable execution unit that is configured to execute a machine code vertex shading program, processing vertex data as specified by the vertex shading program. For example, the vertex shader 204 may be programmed to transform the vertex data from an object-based coordinate representation (object space) to an alternatively based coordinate system such as world space or normalized device coordinates (NDC) space. The vertex processing unit 204 may access data that is stored in GPU local memory 140.

The primitive assembly unit 206 is a fixed-function unit that receives processed vertex data from vertex shader 204 and constructs graphics primitives, e.g., points, lines, triangles, or the like, for processing by the geometry shader 208. In alternative embodiments, a second primitive assembler (not shown) may be included subsequent to the geometry shader 208 in the data flow through the GPU 130. The geometry shader 208 is a programmable execution unit that is configured to execute a machine code geometry shading program, processing graphics primitives received from the primitive assembly unit 206 as specified by the geometry shading program. For example, in addition to well-known per-primitive operations such as clipping, the geometry shader 208 may be programmed to subdivide the graphics primitives into one or more new graphics primitives and calculate parameters, such as plane equation coefficients, that are used when the new graphics primitives are rasterized. The geometry shader 208 may access data that is stored in the GPU local memory 140. The geometry shader 208 outputs the parameters and new graphics primitives to the rasterizer 210.

The rasterizer 210 is a fixed-function unit that scans the new graphics primitives and outputs fragments, each containing fragment data, which may include raster position, depth complexity or interpolated vertex attributes, such as texture coordinates and opacity, to the fragment shader 212.

The fragment shader 212 is a programmable execution unit that is configured to execute a machine code fragment shading program, processing fragments received from rasterizer 210 as specified by the machine code fragment shading program. For example, the fragment shader 212 may be programmed to perform operations such as perspective correction, shading, blending, and the like, to produce shaded fragments that are output to the raster operations unit 214. The fragment shading engine 212 may access data that is stored in buffers in the GPU local memory 140, such as the A-Buffer 144 and the storage buffers 146. The raster operations unit 214 optionally performs fixed-function computations such as near and far plane clipping and raster operations, such as stencil, z test, blending and the like, and outputs pixel data as processed graphics data for storage in a buffer in the GPU local memory 140, such as the A-Buffer 144 or the frame buffer 142. Together, the rasterizer 210, the fragment shader 212 and the raster operations unit 214 represent the fragment processing domain of the GPU 130, where the raster operations unit 214 may be used to operate on individual pixels or small squares of pixels, and the fragment shader 212 may be programmed to iterate across groups of pixels.

Figure 3A:
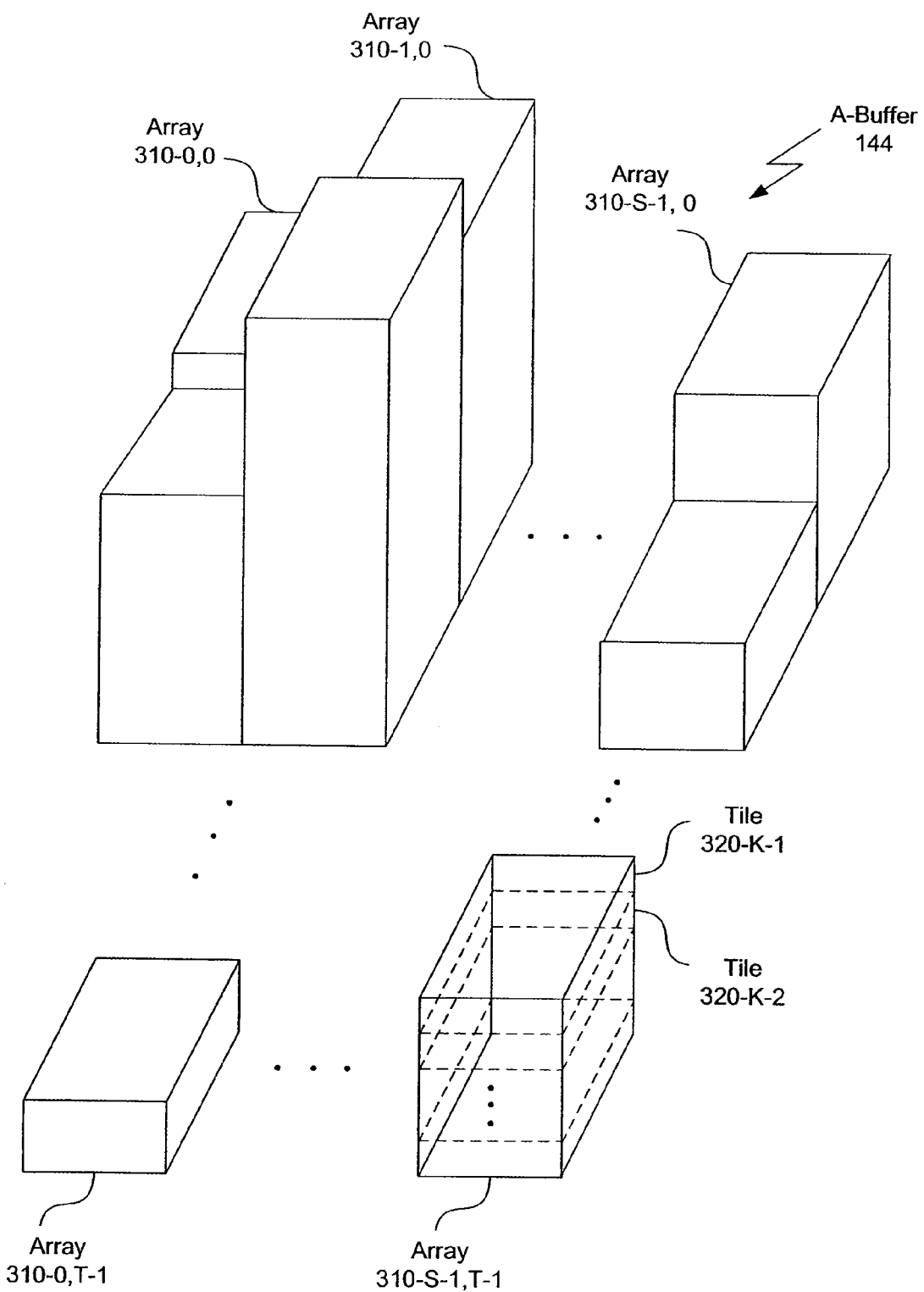
FIGS. 3A and 3B are conceptual diagrams of the A-Buffer of FIG. 1, according to one embodiment of the invention.
Figure 3B:
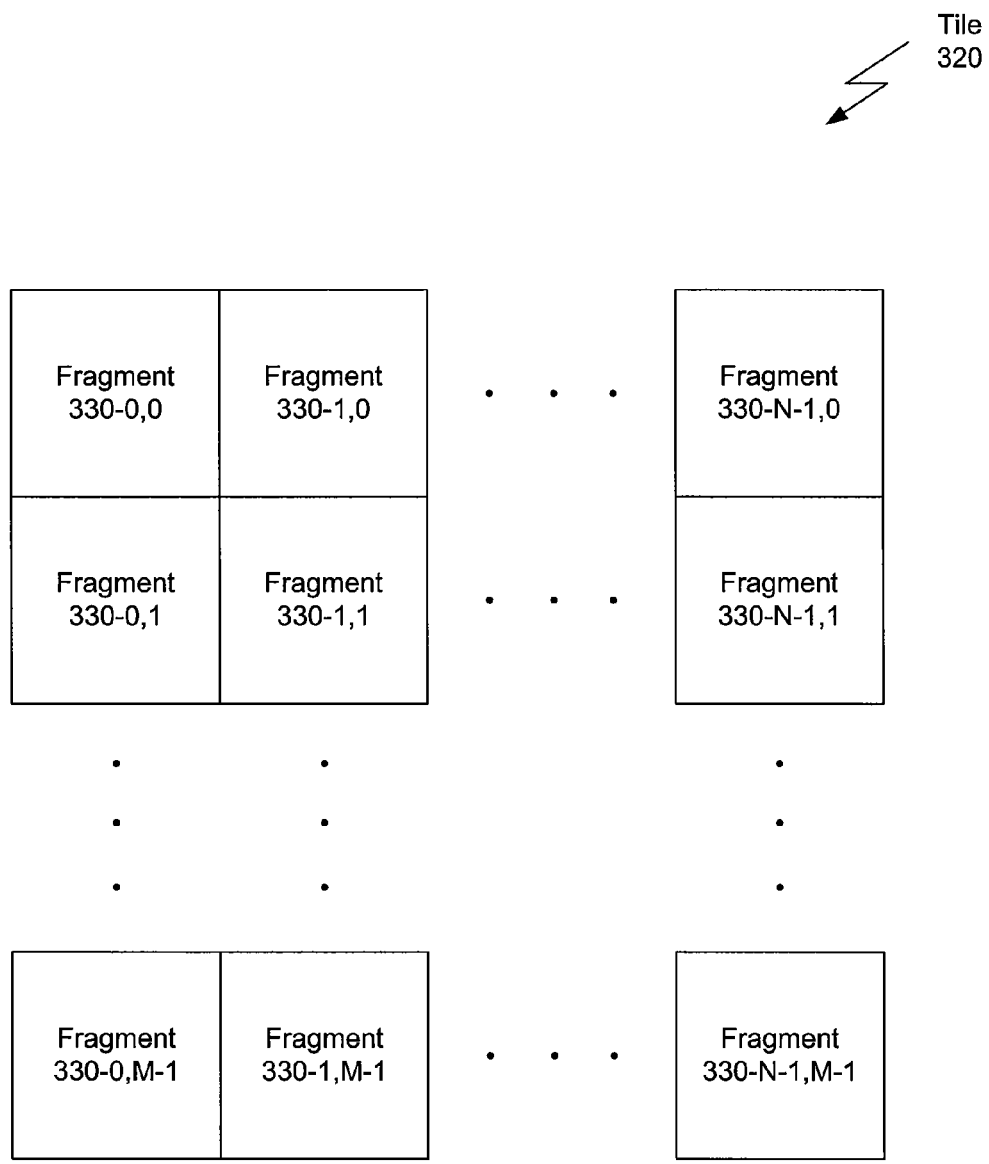

FIGS. 3A and 3B are conceptual diagrams of the A-Buffer 144 of FIG. 1, according to one embodiment of the invention. As shown in FIG. 3A, the A-Buffer 144 may include one or more arrays 310. Each of the arrays 310 may be configured to represent the fragments associated with a different group of proximally located N-by-M pixels in an image frame. Together, the arrays 310 may represent all of the fragments associated with all of the pixels in the image frame.

As shown in detail for the array 310-S-1,T-1, each of the arrays 310 may be subdivided into any number of two-dimensional tiles 320. And, as shown in detail in FIG. 3B, each tile 320 may be configured to include an N-by-M set of fragments 330, selected and arranged to correspond to the N-by-M pixel group represented by a specific array 310. Each tile 320 may be further configured to include only fragments 330 at a given depth complexity. In such a configuration, the tiles 320 included in a given array 310 may, together, represent all of the fragments 330 associated with the N-by-M pixel group represented by the array 310, where each of the tiles 320 represents the subset of the fragments 330 at a particular depth complexity. As set forth in greater detail herein, organizing the fragments 330 in such a manner, by both depth complexity and associated pixel proximity, optimizes the locality of memory references.

The size of the tiles 320, and consequently the size of the pixel group represented by each array 310, may be chosen by the designer, and may be uniform across the A-Buffer 144. The size of the tiles 320 in conjunction with the size of the image frame may determine the number of the arrays 310 in the A-Buffer 144. Suppose, for example, that a tile size of four-by-two pixels is chosen. And, suppose the size of a given image frame is eight-by-four pixels. The pixels in the image frame may be divided into four subsets of four-by-two pixels, and the A-Buffer 144 may be configured to include four arrays 310 of four-by-two tiles 320. In other embodiments, the tile size may be chosen to be more or less than four-by-two, and the number of arrays 310 in the A-Buffer 144 may be more or less than four. Furthermore, the size of the tiles 320 may be chosen, in any technically feasible fashion, to facilitate efficient memory access, considering factors such as the burst-lengths of the memory elements within the system and memory locality.

Referring back now to FIG. 3A, the number of tiles 320 in each array 310 may differ. Since each of the tiles 320 corresponds to a specific depth complexity, the number of tiles 320 in a given array 310 corresponds to the maximum depth complexity associated with any of the pixels represented by the array 310. For example, if a given array 310 were to represent pixels having two depth complexities, such as depths zero and one, then the array 310 would include two tiles 320 that include one or more fragments 330 at these two depth complexities. Similarly, if a given array 310 were to include three tiles 320, then the array 310 would include fragments 330 at three different depth complexities, such as depth complexities zero, one, and two. The GPU 130 is configured to assign tiles to each of the arrays 310, calculating the maximum depth complexity associated with the N-by-M group of pixels represented by a particular array 310 to determine the appropriate number of tiles to allocate for that array 310.

The computing system 100 is configured to re-allocate the A-Buffer 144 for each image frame, determining the structure of the A-Buffer by the size and complexity of the image frame, as described above.

Figure 4:
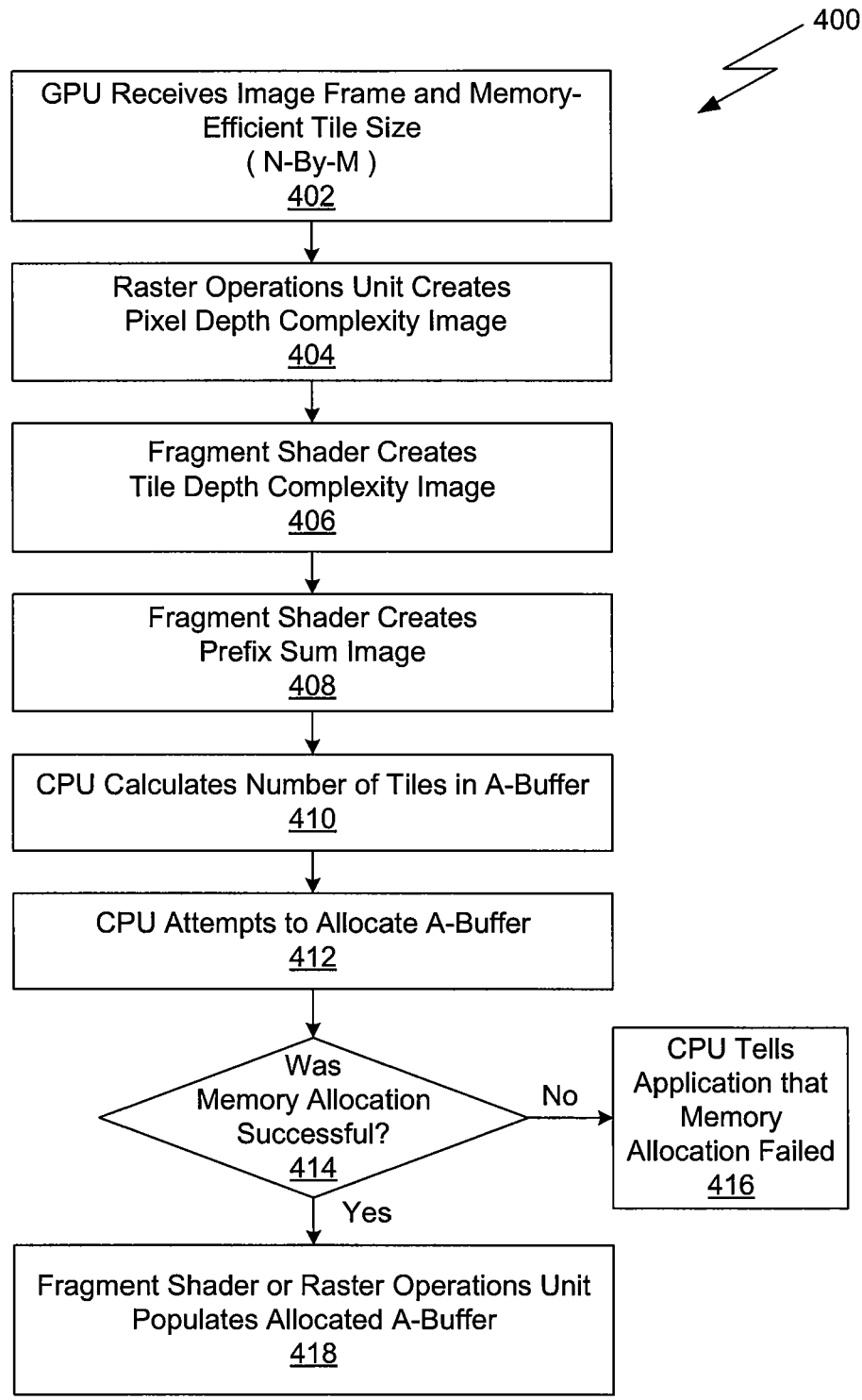
FIG. 4 is a flow diagram of method steps for creating the A-Buffer of FIG. 1, according to one embodiment of the invention.

FIG. 4 is a flow diagram of method steps for creating the A-Buffer 144 of FIG. 1, according to one embodiment of the invention. Although the method steps are described in conjunction with the systems for FIGS. 1 and 2, persons skilled in the art will understand that any system that performs the method steps, in any order, is within the scope of the invention.

Figure 6A:
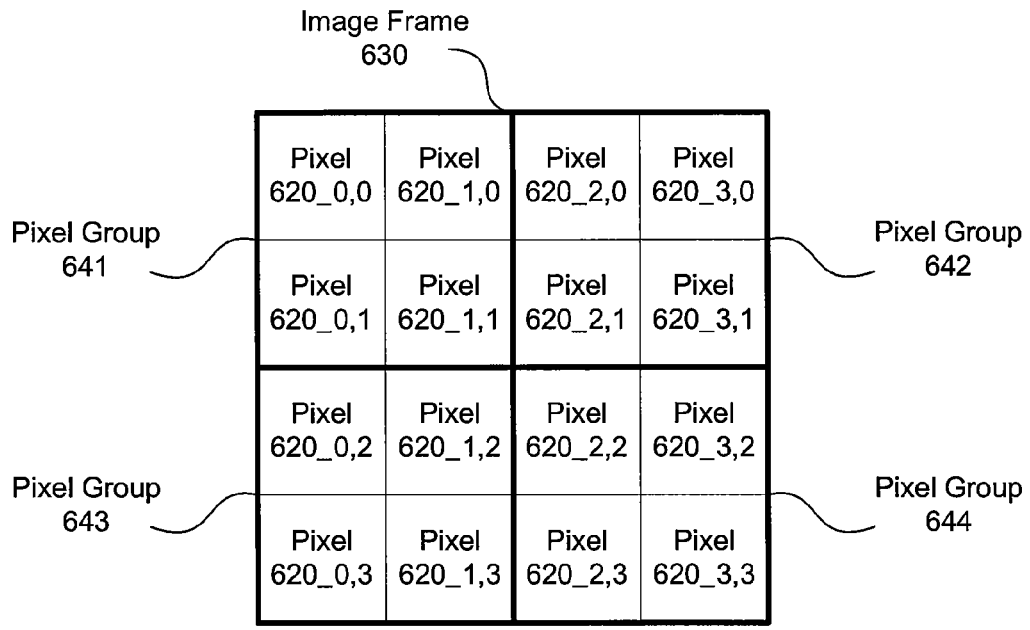
FIGS. 6A and 6B are conceptual diagrams of image data used to determine the structure of the A-Buffer of FIG. 1, according to one embodiment of the invention.

The method 400 begins at step 402, where the GPU 130 receives an image frame and a memory efficient tile size, N-by-M. As described above in conjunction with FIG. 3, the tile size corresponds to the size of the pixel group represented by each of the arrays 310 in the A-Buffer 144 and may be determined in any technically feasible fashion. FIG. 6A illustrates an exemplary image frame 630. As shown, the image frame 630 includes sixteen pixels 620_0,0-3,3, arranged in a four-by-four rectangle. Each of the pixels 620 may include any number of fragments 330 (not shown).

Figure 6B:
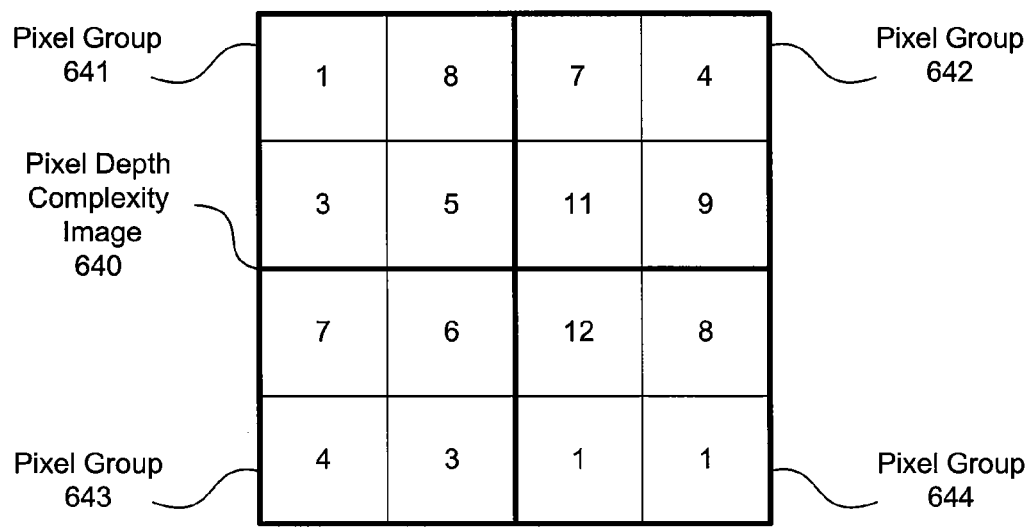

In step 404, the raster operations unit 214 creates a pixel depth complexity image by calculating the depth complexity for each pixel in the image frame. FIG. 6B illustrates an exemplary pixel depth complexity image 640 corresponding to the image frame 630 of FIG. 6A. As shown, the pixel depth complexity image 640 includes sixteen entries, each entry representing the depth complexity of the corresponding pixel in the image frame 630. For example, the pixel depth complexity image 640 shows a depth complexity of twelve for the pixel 620__2,2, a depth complexity of eight for pixel 620__3, 2, a depth complexity of one for the pixel 620__2,3, and a depth complexity of one for the pixel 620__3,3.

In step 406, the fragment shader 212 creates a tile depth complexity image based on the pixel depth complexity image generated in step 404. More specifically, the fragment shader 212 divides the pixel depth complexity image into N-by-M groups of pixels, where N-by-M is the tile size received in step 402. As part of step 406, the fragment shader 212 assigns each N-by-M group of pixels to a specific array 310 in the A-Buffer 144. For example, referring again to FIG. 6A, the sixteen pixels 620 in the image frame 630 are divided into four two-by-two groups of pixels, pixel groups 641-644. Therefore, the A-Buffer would have four arrays, one corresponding to each of the two-by-two pixel groups 641-644.

Also as part of step 406, the fragment shader 212 evaluates the pixel depth complexities of each of the pixels associated with each of the N-by-M pixel groups and determines a single depth complexity for each N-by-M pixel group. The single pixel depth complexity corresponds to the maximum depth complexity associated with the pixels within the N-by-M pixel group. The fragment shader 212 then arranges all of the maximum depth complexity values into a tile depth complexity image, where each entry in the tile depth complexity image defines the number of tiles 320 assigned to the array 310 in the A-Buffer 144 associated with a particular N-by-M pixel group (the entry in the tile depth complexity image is referred to as the "tile depth complexity" of the array 310). Consequently, the size of the tile depth complexity image is a factor of N-by-M smaller than the corresponding pixel depth complexity image. FIG. 7A illustrates an exemplary tile depth complexity image 720 corresponding to the pixel depth complexity image 640 of FIG. 6B. As shown, the tile depth complexity image 720 includes four entries, each entry representing the calculated tile depth complexity of an array 710 corresponding to a particular pixel group 641-644. For example, the tile depth complexity image 720 shows a tile depth complexity of twelve for the array 710__1,1, which corresponds to the pixel group 644 of FIG. 6B. This tile depth complexity corresponds to the maximum depth complexity associated with the four pixels, pixel 620__2,2, pixel 620__3, 2, pixel 620__2,3, and pixel 620__3,3, within the pixel group 644. Likewise, the tile depth complexity image 720 shows a tile depth complexity of eight for the array 710__0,0. This tile depth complexity corresponds to the maximum depth complexity associated with the four pixels, pixels 620__0,0, pixel 620__1,0, pixel 620__0,1, and pixel 620__1,1, within the pixel group 641.

In step 408, the fragment shader 212 creates a prefix sum image of the tile depth complexity image. In so doing, the fragment shader 212 orders the arrays 310 of the A-Buffer 144 in any technically feasible fashion before performing the prefix sum operations. For example, the fragment shader 212 may order the arrays 310 by row-majority, set the first entry in the prefix sum image to zero, and thereafter add the nth entry in the tile depth complexity image to the nth entry in the prefix sum image to obtain the nth+1 entry in the prefix sum image. The prefix sum image is the same size as the tile depth complexity image, where each entry corresponds to a specific array 310 in the A-Buffer 144 and indicates the number of tiles 320 in the A-Buffer 144 that come before the first tile 320 in that specific array 310. FIG. 7B illustrates an exemplary prefix sum image 740, corresponding to the tile depth complexity image 720 of FIG. 7A. As shown, the exemplary prefix sum image 740 includes four entries, each entry representing the number of tiles that come before a particular array 710 in the A-Buffer. As illustrated, in the prefix sum image 740, the arrays 710 have been ordered from first to last as follows: 710__0,0; 710__1,0; 710__0,1; 710__1,1. The prefix sum image 740 shows that the number of tiles that come before the array 710__0,1 in the A-Buffer is nineteen, which is the sum of the entry in the tile depth complexity image 720 for the tile 710__1,0 (eleven) and the entry in the prefix sum image 740 for the tile 710__1,0 (eight). Likewise, the prefix sum image 740 show that the number of tiles that come before the array 710__1,0 in the A-Buffer is eight, which is the sum of the entry in the tile depth complexity image 720 for the tile 710__0,0 (eight) and the entry in the prefix sum image 740 for the tile 710__0,0 (zero).

In step 410, the CPU 102 calculates the total number of tiles 320 in the A-Buffer 144. In one embodiment, the CPU adds the last entry in the tile depth complexity image, representing the number of tiles 320 in the last array 310 of the A-Buffer 144, to the last entry in the prefix sum image, representing the total number of tiles 320 that come before the last array 310 in the A-Buffer 144, to determine the total number of tiles 320 in the A-Buffer 144. An exemplary calculation corresponding to the step 410 is illustrated in FIG. 7C using the tile depth complexity image 720 of FIG. 7A and the prefix sum image 740 of FIG. 7B. As shown, the total number of tiles in the A-Buffer is equal to the sum of the number of tiles in the last array of the A-Buffer, which is represented by the last entry in the tile depth complexity image 720 (twelve) and the number of tiles before the last array of the A-Buffer, which is represented by the last entry in the prefix sum image 740 (twenty-six). The result, thirty-eight, is the total number of tiles in the A-Buffer.

In step 412, the CPU 102 calculates the size of the A-Buffer 144 by multiplying the total number of tiles 320 determined in step 410 by the tile size and attempts to allocate the corresponding memory for the A-Buffer 144.

In step 414, if the CPU 102 determines that the memory allocation failed, then the method 400 proceeds to step 416, where the CPU 102 tells the application program 112 that the memory allocation for the A-Buffer 144 failed. The method 400 then terminates. The application program 112 may respond to this notification by iteratively reducing the size of the scene the application program 112 is trying to render until the memory allocation for the A-Buffer 144 succeeds. If, in step 414, the CPU 102 determines that the memory allocation succeeded, then the method 400 proceeds to step 418.

In step 418, once the appropriate memory for the A-Buffer 144 is allocated, the GPU 130 populates the A-Buffer 144 with the various fragment data associated with the image frame. The GPU 130 may use either the raster operations unit 214 or the fragment shader 212 to populate the A-Buffer 144. The raster operations unit 214 may be more efficient at performing some A-Buffer 144 operations; however, since the fragment shader 212 may execute a machine code geometry shading program, the fragment shader 212 may be more flexible. As part of step 418, the raster operations unit 214 or the fragment shader 212 may address the A-Buffer 144 using the method 500 described below in FIG. 5.

Figure 5:
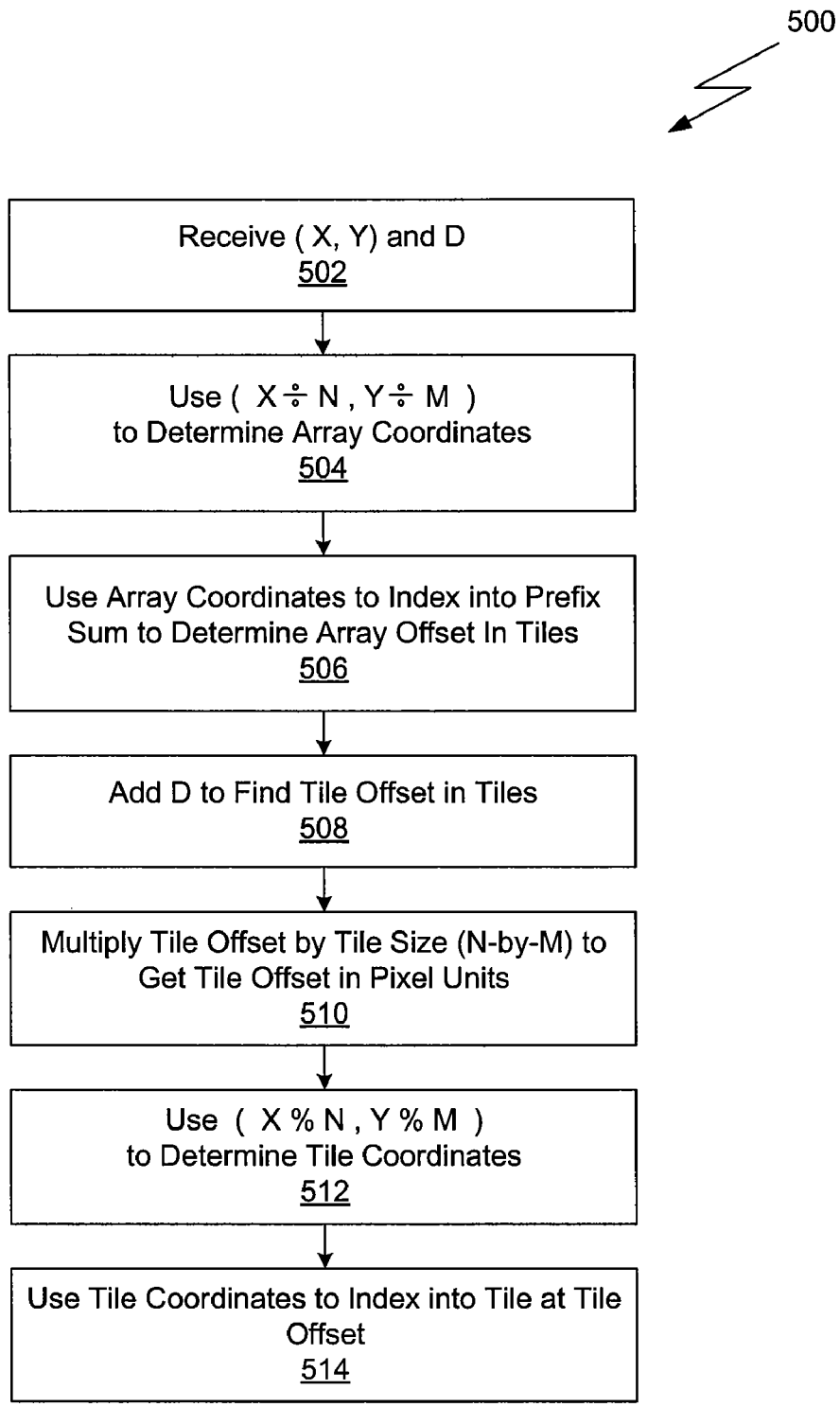
FIG. 5 is a flow diagram of method steps for addressing the A-Buffer of FIG. 1, according to one embodiment of the invention.

FIG. 5 is a flow diagram of method steps for addressing the A-Buffer 144 of FIG. 1, according to one embodiment of the invention. Although the method steps are described in conjunction with the systems for FIGS. 1 and 2, persons skilled in the art will understand that any system that performs the method steps, in any order, is within the scope of the invention. Each step in method 500 may be executed by the GPU 130 using the raster operations unit 214, the fragment shader 212, or any combination thereof.

The method 500 begins at step 502, where the GPU 130 receives three values, (X, Y, D). The two-dimensional coordinates (X, Y) specify the coordinates of a pixel in a two-dimensional image frame, and D specifies the depth complexity of a particular fragment associated with the pixel. In step 504, the GPU 130 uses the N-by-M tile size of the A-Buffer 144 to calculate the two-dimensional coordinates of the array 310 that includes the pixel located at image coordinates (X, Y). The GPU 130 may perform this calculation in any technically feasible manner. For example, the GPU 130 may calculate the array coordinates using the integer division operations, (X÷N, Y÷M). Illustratively, referring again to the image frame 630 of FIG. 6A and recalling that the exemplary tile size is two-by-two, the array coordinates for a pixel located at coordinates (1, 2) in the image frame 630 would be (1÷2, 2÷2)=(0, 1).

In step 506, the GPU 130 uses the array coordinates calculated in step 504 to index into the prefix sum image generated in step 408 of method 400 to determine the array offset (in tiles) of the array 310 that includes the pixel located at image coordinates (X, Y). Indexing into the prefix sum image may be accomplished in any technically feasible fashion corresponding to the organization of the arrays 310 in the prefix sum image. For example, the first of the two array coordinates may indicate the column number of the prefix sum image, and the second of the two array coordinates may indicate the row number of the prefix sum image. The array offset represents the number of tiles 320 in the A-Buffer 144 that come before the first tile 320 in the array 310 that includes the pixel located at image coordinates (X, Y). For example, referring again to FIG. 7B, by using the array coordinates (0, 1) calculated above to index into the prefix sum image 740, thereby accessing the entry at column number zero and row number one, the array offset corresponding to the array that includes the pixel at image coordinates (1, 2) in the image frame 630 is determined to be nineteen. In other words, there are nineteen tiles in the A-Buffer corresponding to the image frame 630 that come before the first tile in the array that contains the pixel located at image coordinates (1, 2) in the image frame 630.

In step 508, the GPU 130 calculates the tile offset (in tiles) of the specific tile 320 that includes the fragment at the depth complexity D associated with the pixel located at the image coordinates (X, Y). Specifically, the GPU 130 adds the specified depth complexity, D, to the array offset calculated in step 506 to compute the tile offset. The tile offset represents the number of tiles 320 in the A-Buffer 144 that come before the specific tile 320 in the A-Buffer 144 that contains the fragment at depth complexity D that is associated with the pixel located at image coordinates (X, Y). For example, where the depth complexity D is two, and the array offset calculated in step 506 for a pixel at image coordinates (1, 2) in the image frame 630 is nineteen, the tile offset is twenty-one. In other words, there are twenty-one tiles in the A-Buffer corresponding to the image frame 630 that come before the tile that contains the fragment at the depth complexity two associated with the pixel located at the image coordinates (1, 2) in the image frame 630.

In step 510, the GPU 130 multiplies the tile offset by the tile size, N-by-M, to determine the tile offset in pixel units. In step 512, the GPU 130 uses the tile size, N-by-M, to calculate the tile coordinates of the pixel located at image coordinates (X, Y). Again, the GPU 130 may perform this calculation in any technically feasible manner. For example, the GPU may calculate the tile coordinates using the modulus operations, (X % N, Y % M). For example, if the image coordinates were (1, 2), and the tile size were two-by-two, then the tile coordinates would be (1% 2, 2, % 2)=(1, 0). In step 514, the GPU 130 uses the computed tile coordinates to index into the tile at the tile offset in pixel units calculated in step 510, thereby addressing the fragment 330 at depth complexity D that is associated with the pixel located at image coordinates (X, Y).

Although embodiments of the present invention have been described in the context of organizing the A-Buffer using two-dimensional tiles, persons skilled in the art will appreciate that the principles of the present invention apply with equal force to implementations where the A-Buffer is organized using different pixel groupings, such as, for example, three-dimensional pixel blocks.

In sum, image rendering performance may be improved by using an A-Buffer structure that allows fragment data to be stored in a way that increases the memory locality to enable high-efficiency memory accesses by the GPU. In one embodiment, the GPU determines the organization of the A-Buffer, generates a prefix sum image to facilitate allocation and addressing of the A-Buffer, populates the A-Buffer, and addresses the A-Buffer, while the CPU determines the overall A-Buffer size and allocates the corresponding memory. In this approach, the A-Buffer is organized in three-dimensional arrays of uniformly-sized two-dimensional rectangular tiles, each array representing a group of pixels and the fragments associated with these pixels. Each tile in a given array includes the set of fragments at a specific depth complexity that are associated with the group of pixels represented by the array. Since each tile corresponds to a specific depth complexity, the number of tiles in a given array corresponds to the maximum depth complexity associated with the pixels in the pixel group represented by the array. To reduce memory usage, the GPU may assign a different number of tiles to each array—calculating and using the maximum depth complexity of the pixels represented by each array to determine the appropriate number of tiles to allocate for the array.

Advantageously, organizing the A-Buffer by both pixel proximity and pixel depth complexity improves the memory locality, thereby increasing the efficiency of memory accesses used when rendering image data. Moreover, the designer may select an appropriate tile size, considering factors such as memory locality and the burst-lengths of the different memory elements in the system, to optimize the performance and memory usage of the A-Buffer. Finally, consolidating A-Buffer operations into the GPU increases the efficiency of these operations and, consequently, improves the overall performance of the graphics pipeline.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

I claim:

1. A method for addressing an A-Buffer used to store pixel information, the method comprising:
   receiving coordinate values that locate a pixel in an image frame and a depth complexity value specifying a depth complexity of a fragment associated with the pixel;
   computing array coordinates based on the coordinate values and a tile size;
   determining an array offset based on the array coordinates;
   computing a tile offset based on the array offset and the depth complexity value;
   converting the coordinate values to tile coordinates that locate the pixel in a tile; and
   locating the pixel within the tile based on the tile offset and the tile coordinates.

2. The method of claim 1, wherein the step of determining the array offset comprises indexing into a prefix sum image using the array coordinates to determine which array within the A-Buffer the tile is located.

3. The method of claim 2, wherein the prefix sum image is generated from a tile depth complexity image, wherein each entry in the prefix sum image corresponds to a pixel group associated with the tile depth complexity image and is equal to a sum of the tiles designated for each preceding pixel group associated with the tile depth complexity image.

4. The method of claim 3, wherein the image frame includes one or more pixel groups, each pixel group being associated with a different array in the A-Buffer, and the tile depth complexity image is generated from a pixel depth complexity image, wherein each entry in the tile depth complexity image reflects a maximum depth complexity associated with a different one of the one or more pixel groups.

5. The method of claim 1, wherein the step of computing the tile offset comprises adding the depth complexity value to the array offset.

6. The method of claim 5, further comprising the step of multiplying the tile offset by the tile size to convert the tile offset to pixel units.

7. The method of claim 6, wherein the step of converting the coordinate values to tile coordinates comprises performing a modulus operation on the coordinate values based on the tile size.

8. The method of claim 7, wherein the step of computing the array coordinates comprises performing an integer division operation on the coordinate values based on the tile size.

9. The method of claim 1, wherein the depth complexity value reflects the depth complexity at which a graphics object intersects the pixel.

10. A non-transitory computer-readable medium including instructions that, when executed by a processing unit, cause the processing unit to address an A-Buffer used to store pixel information, by performing the steps of:
    receiving coordinate values that locate a pixel in an image frame and a depth complexity value specifying a depth complexity of a fragment associated with the pixel;
    computing array coordinates based on the coordinate values and a tile size;
    determining an array offset based on the array coordinates;
    computing a tile offset based on the array offset and the depth complexity value;
    converting the coordinate values to tile coordinates that locate the pixel in a tile; and
    locating the pixel within the tile based on the tile offset and the tile coordinates.

11. The non-transitory computer-readable medium of claim 10, wherein the step of determining the array offset comprises indexing into a prefix sum image using the array coordinates to determine which array within the A-Buffer the tile is located.

12. The non-transitory computer-readable medium of claim 11, wherein the prefix sum image is generated from a tile depth complexity image, wherein each entry in the prefix sum image corresponds to a pixel group associated with the tile depth complexity image and is equal to a sum of the tiles designated for each preceding pixel group associated with the tile depth complexity image.

13. The non-transitory computer-readable medium of claim 12, wherein the image frame includes one or more pixel groups, each pixel group being associated with a different array in the A-Buffer, and the tile depth complexity image is generated from a pixel depth complexity image, wherein each entry in the tile depth complexity image reflects a maximum depth complexity associated with a different one of the one or more pixel groups.

14. The non-transitory computer-readable medium of claim 10, wherein the step of computing the tile offset comprises adding the depth complexity value to the array offset.

15. The non-transitory computer-readable medium of claim 14, further comprising the step of multiplying the tile offset by the tile size to convert the tile offset to pixel units.

16. The non-transitory computer-readable medium of claim 15, wherein the step of converting the coordinate values to tile coordinates comprises performing a modulus operation on the coordinate values based on the tile size.

17. The non-transitory computer-readable medium of claim 16, wherein the step of computing the array coordinates comprises performing an integer division operation on the coordinate values based on the tile size.

18. The non-transitory computer-readable medium of claim 10, wherein the depth complexity value reflects the depth complexity at which a graphics object intersects the pixel.

19. A computer system, comprising:
    a memory that includes an A-Buffer configured to store pixel information; and
    a processing unit configured to address the A-Buffer by:
        receiving coordinate values that locate a pixel in an image frame and a depth complexity value specifying a depth complexity of a fragment associated with the pixel,
        computing array coordinates based on the coordinate values and a tile size;
        determining an array offset based on the array coordinates,
        computing a tile offset based on the array offset and the depth complexity value,
        converting the coordinate values to tile coordinates that locate the pixel in a tile, and
        locating the pixel within the tile based on the tile offset and the tile coordinates.

20. The computer system of claim 19, wherein determining the array offset comprises indexing into a prefix sum image using the array coordinates to determine which array within the A-Buffer the tile is located, and wherein the prefix sum image is generated from a tile depth complexity image, each entry in the prefix sum image corresponding to a pixel group associated with the tile depth complexity image and equaling a sum of the tiles designated for each preceding pixel group associated with the tile depth complexity image.

* * * * *